Patented Oct. 17, 1922.

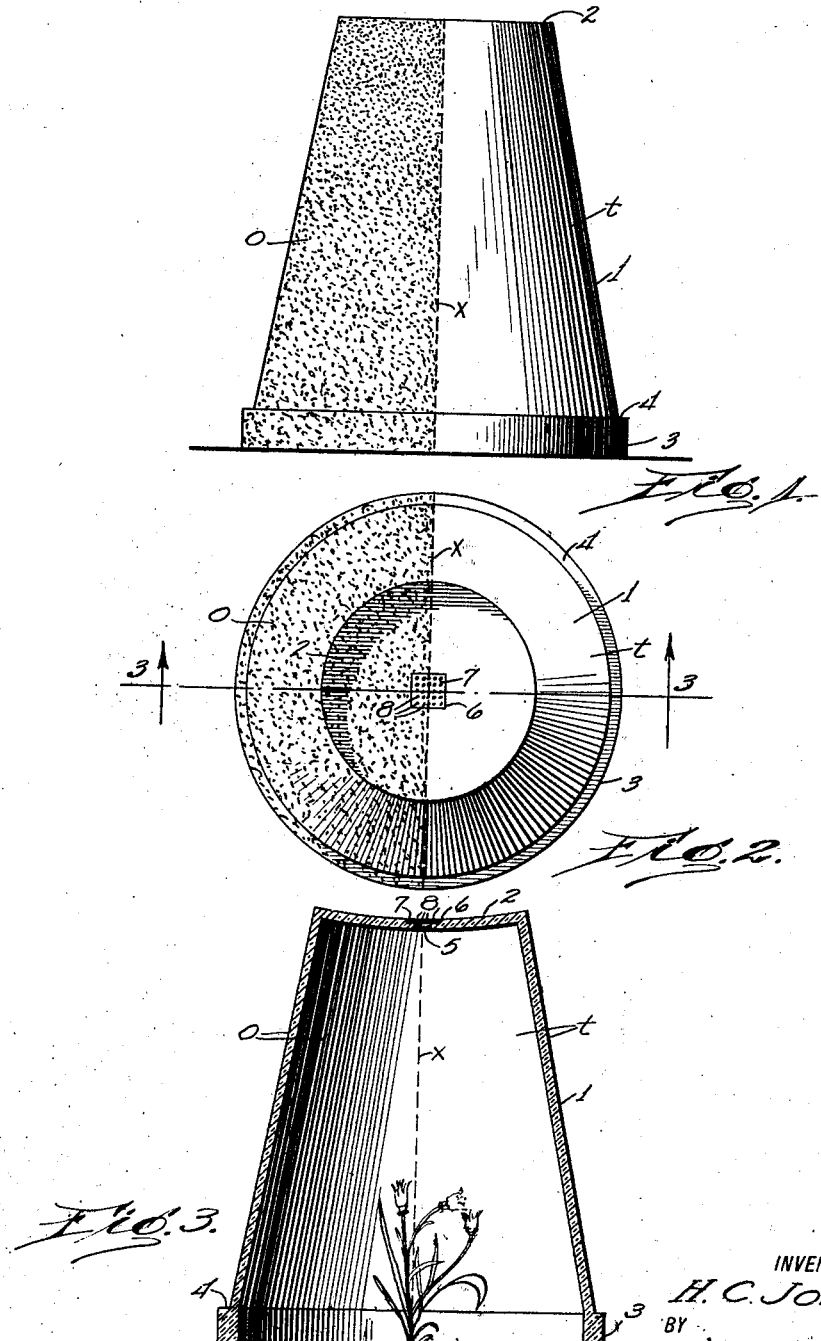

1,432,339

UNITED STATES PATENT OFFICE.

HENRY C. JONES, OF PONTIAC, ILLINOIS; MARY A. JONES AND C. R. TOMBAUGH EXECUTORS OF SAID HENRY C. JONES, DECEASED.

PLANT PROTECTOR.

Application filed April 4, 1921. Serial No. 458,236.

*To all whom it may concern:*

Be it known that I, HENRY C. JONES, a citizen of the United States, and a resident of the city of Pontiac, in the county of Livingston and State of Illinois, have invented a new and useful Improvement in Plant Protectors, of which the following is a full, clear, and exact description.

My invention relates to improvements in plant protectors, and it consists in the combinations, constructions and arrangements herein described and claimed.

An object of my invention is to provide a simple, inexpensive, and durable device that is adapted to be placed over a young plant when the latter has been transferred to a garden or truck field, whereby the plant is protected from injury on account of sudden and excessive temperature changes, from hail, heavy rainfall, snow, etc., and from the attacks of insects and like pests that are destructive to young plants.

A further object of my invention is to provide a device of the character described that is adapted to admit the rays of the sun so that the air within the device and the soil around the roots of the plant will be warmed while at the same time the plant will be shaded from the direct rays of the mid-day sun.

A further object of my invention is to provide a device of the character described that is provided with an opening to insure proper ventilation of the interior of the device and to permit water to be introduced thereinto for sprinkling the plant.

A further object of my invention is to provide a device of the character described that is thoroughly effective for the purpose intended and practical commercially.

Other objects and advantages will appear in the following specification and the novel features of the invention will be particularly pointed out in the appended claims.

My invention is illustrated in the accompanying drawings, forming part of this application, in which, Figure 1 is a side elevation of the device, Figure 2 is a plan view of the device, operatively applied, and Figure 3 is a section along the line 3—3 of Fig 2.

In carrying my invention into effect, I provide a plant protector made entirely of glass and having a frusto-conical body portion 1 provided with an integral upper end or top 2, the lower and larger end being open. The body portion 1 is formed with a strengthening band or exteriorly extending flange 3 around its lower edge, thereby defining an annular shoulder 4. It will be understood that the flange is integral with the body portion 1. The upper end or top 2 is concaved or dished and is formed with a relatively small central opening 5 surrounded by a recess or socket 6 in the upper surface of the top 2. A zinc cover 7 that is perforated, as at 8, may be placed in the recess or socket 6 to prevent the ingress of insects into the interior of the body portion 1 through the opening 5.

As stated, the device is preferably made of glass although obviously any analogous material may be used. Approximately one-half of the device is formed of a transparent material while the other half portion is formed or rendered practically opaque. In the drawings, the line $x$ indicates the line of junction of the transparent section $t$ with the practically opaque section $a$. When the device is made of glass, as in the present instance, the section to be rendered opaque may be painted, frosted, or treated in any other well known manner.

From the foregoing description of the various parts of the device, the operation thereof may be readily understood. The device is placed over a young plant that has been removed from a hot-bed or greenhouse at the beginning of the season and transplanted in a garden or field where it is to remain until it matures. The device is arranged with the colored or practically opaque section thereof facing the south so that the plant covered thereby will be shaded from the heat of the mid-day sun. Since the top or upper end portion of the device is concaved or dished and provided with a central opening, water may be conveniently introduced into the interior of the device for sprinkling the plant housed therein. When required, the cover 6 that is formed of zinc or a like material is maintained in position to cover the opening 5 so as to exclude insects from the interior of the device. The cover 6 is perforated and consequently will not interfere with the introduction of water into the device.

Since a section of the device is formed of a clear or transparent substance, preferably glass, the rays of the sun are permitted to pass into the interior of the device to warm the soil around the roots of the plant and to thereby promote and hasten its growth. At the same time, the colored section of the device shades the plant from the direct rays of the sun at mid-day.

The opening 5 provides a ventilator for the device. When the plant protectors are removed from their positions in the field after having served the purpose for which intended, they may be nested to occupy but little space since the open end of one will fit over the small end of another to rest upon the shoulder 4 of the latter.

The device is thoroughly effective for the purpose intended, is inexpensive to manufacture, and is not likely to be broken easily. In fact, the device is sufficiently durable to last indefinitely under normal service conditions.

I claim:

1. A device of the character described comprising a substantially conical body portion formed with a segmental section thereof rendered practically opaque and with the remainder thereof transparent.

2. A device of the character described comprising a body portion made of glass and having an integral end wall at the smaller end thereof formed with a concaved upper surface and provided with a central opening therethrough, said device being formed with a section thereof practically opaque and with the remainder thereof transparent, the line of junction of said practically opaque section and said transparent section being in the central vertical plane through the device.

HENRY C. JONES.